Aug. 16, 1960 L. H. FLORA 2,948,958
METHOD OF ASSEMBLING A FASTENING DEVICE
Original Filed May 22, 1957
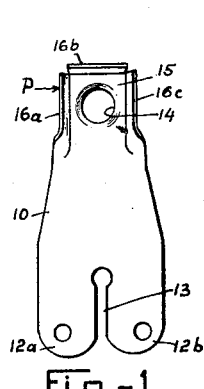
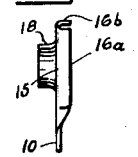
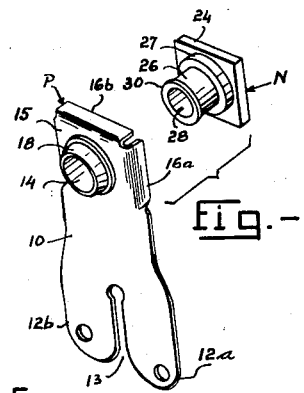
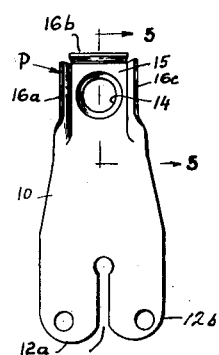
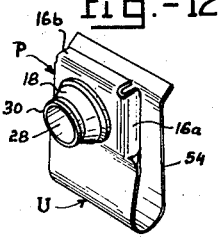
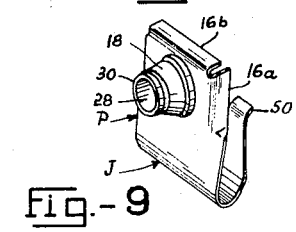
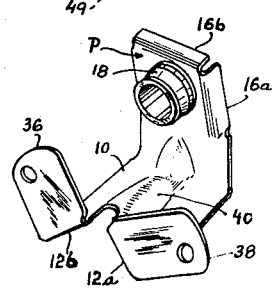
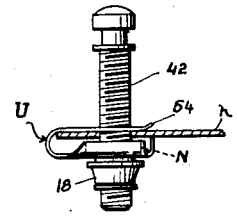
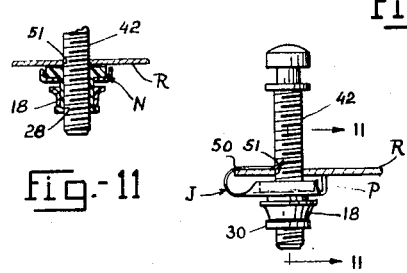
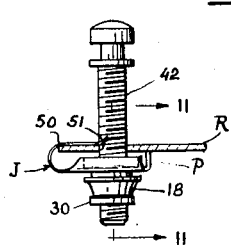
INVENTOR.
LAWRENCE H. FLORA
BY
Bates, Teare & M<sup>c</sup>Bean
ATTORNEYS United States Patent Office 2,948,958
Patented Aug. 16, 1960

2,948,958

METHOD OF ASSEMBLING A FASTENING DEVICE

Laurence H. Flora, North Olmsted, Ohio, assignor to Tinnerman Products, Inc., Cleveland, Ohio, a corporation of Ohio Original application May 22, 1957, Ser. No. 660,846. Divided and this application Mar. 10, 1958, Ser. No. 720,327

3 Claims. (Cl. 29—432)

This application relates to a fastening device for holding a nut of plastomeric material, and more particularly to a method for assembling the nut to a metallic fastener for retaining the nut securely in bolt-receiving position.

In many types of fastening applications, fasteners are used which are adapted to retain or receive a nut or the like in bolt-receiving position therein. The nut is often formed of plastomeric material, which is particularly advantageous since it is readily molded, has the required strength and elasticity, and is elastically thread impressionable. However, plastomeric materials have a disadvantageous aging characteristic, in that the material eventually becomes brittle and cracks to the extent that the fastener is no longer able to retain the nut in bolt-receiving position. A further disadvantage of such fasteners is the fact that they hold the nut very rigidly in position (before the nut becomes brittle and cracks), with the result that there is no allowance for misalignment of the units or parts which the fastener is adapted to correct.

An object of the present invention is to provide a method of assembling a plastomeric nut to a metallic fastener, so as to retain the nut even though the nut should become brittle and should crack, and which will operate to connect the assocciated parts even though they be vitally misaligned with respect to each other.

Briefly, the foregoing objects are accomplished by the provision of an apertured fastener for holding a sleeved plastomeric nut in bolt-receiving position upon a part to be joined. This is accomplished by providing a separate sleeve member adapted to tightly embrace that portion of the nut sleeve which extends through the aperture in the fastener. The separate sleeve member may be formed from the apertured portion of the body of the fastener at the time the nut is assembled in the body. Additionally, the separate sleeve member has an outside diameter larger than the diameter of the aperture and operates to engage one side of the body to limit movement of the nut in one direction with respect to the body. The nut may have a base portion overhanging the aperture and which engages the other side of the body to limit movement of the nut in the opposite direction with respect to the body. The fastener may be provided with any suitable means for securing the same to a part to be joined. With the above "sleeve-in sleeve" construction, the plastomeric nut is securely held in bolt-receiving position even if the nut becomes brittle and cracks. Additionally, this construction allows the nut to "float" in position, thereby enabling the fastener to join misaligned parts.

In the drawings Fig. 1 is a front elevational view of a partially fabricated fastening device showing an initial step in the formation of the nut retaining portion thereof;

Fig. 2 is a side elevational view of the upper or nut retaining portion of the fastening device shown in Fig. 1;

Fig. 3 is a front elevational view of the fastening device shown in Fig. 1 and showing a further step in the formation of the nut retaining portion thereof;

Fig. 4 is a side elevational view of the upper or nut retaining portion of the fastening device shown in Fig. 3;

Fig. 5 is an enlarged side elevational sectional view taken along the lines 5—5 of Fig. 3;

Fig. 6 is a perspective view of the fastening device shown in Fig. 3 and showing a plastomeric sleeve nut in position prior to its assembly into the nut retaining portion of the fastening device;

Fig. 7 is a perspective view of a further step in the formation of the fastening device shown in Figs. 1 through 6;

Fig. 8 is a side elevational view of the completed fastening device shown in Figs. 1 through 7, and showing a bolt threadedly retained in the plastomeric nut therein. This view also shows in dot-dash lines objects secured to the bolt shank and the bolt head, and a panel upon which the fastening device is secured;

Fig. 9 is a perspective view of a modified form of the fastening device shown in Fig. 8;

Fig. 10 is a side elevational view of a mounting assembly using the fastening device shown in Fig. 9. In this view, the panel upon which the fastening device is mounted is shown in section;

Fig. 11 is an end elevational sectional view taken along the line 11—11 of Fig. 10;

Fig. 12 is a perspective view of another modification of the fastening device shown in Fig. 8;

Fig. 13 is a side elevational view of a mounting assembly using the fastening device shown in Fig. 12. In this view, the panel upon which the device is fastened is shown in section.

The fastener or clip of the invention is preferably constructed of a metallic material such as a blank of sheet metal strip. Referring to Fig. 1, a metal strip 10 may be cut to form a configuration substantially as shown, said strip having at one end the arms or legs 12a and 12b separated by the slot 13, and having the nut-receiving portion P formed at the other end thereof.

The nut-receiving portion P, in the present instance, includes a generally rectangular planular surface in the form of a body or base portion 15, which contains a centrally disposed aperture 14, and the flanges 16a, 16b and 16c, extending generally outward in substantially the same direction from the respective edges thereof. The flanges act to prevent rotation of a square-headed sleeve nut N, which the portion P is adapted to retain as will be hereinafter described. The aperture 14 may be formed by a punching and extrusion operation, whereby a tubular portion or sleeve 18 (Fig. 2) is formed circumferentially around the aperture. In the extrusion operation, the sleeve 18 is partially severed from the body 15 as shown in Figs. 3, 4 and 5, to form a weakened line of severance therebetween. At this point, the sleeve 18 is partially severed from the body by an amount which will enable its complete severage after the plastomeric nut N has been inserted therein, as will be hereinafter described. The ratio of the severed portion of the sleeve to the unsevered portion thereof is represented by the letters A and B respectively (Fig. 5). Although any suitable ratio may be used which will effect a facile severance of the extruded sleeve from the body after the nut is inserted therein, satisfactory severance has been achieved when the ratio of A to B is substantially 60%.

After the sleeve 18 has been extruded and partially severed as aforedescribed, the partially fabricated fastening device is ready to receive the nut N in the nut-receiving portion P. The nut N, in the present instance, is formed preferably of a plastomeric material and comprises a rectangular base or head portion 24 having a shank in the form of a tubular member or sleeve portion 26 disposed substantially centrally thereon and extending at substantially a right angle therefrom. The tube portion 26 contains an aperture or opening 28 which extends through the tube and through the base portion 24.

To assemble the nut N in the nut-receiving portion P, the fastening device and the nut are positioned as shown in Fig. 6, after which the tube portion 26 of the nut is forced through the body aperture 14 and through the sleeve 18. In the next successive operation, the sleeve 18 may be severed completely from the body 15, as shown in Fig. 8, thereby placing the nut in bolt-receiving position in the fastening device. This latter operation may be effected by the same force with which the tube portion 26 of the nut was forced into the sleeve 18 in one continuous operation, or it may be accomplished by a separate blow at the next station of the die to complete the severance of the extruded sleeve from the body 15. Disposed at the base end of the nut tube portion 26 is a circumferential flange 27 (Fig. 6), which is adapted to coact with the circumferential shoulder 29 (Fig. 5) on the sleeve 18 to facilitate the severance of the latter from the body of the fastener when pressure is exerted against the nut as aforesaid. Additionally, the tube portion 26 contains a circumferential flange 30 at the outer end thereof having an outside diameter greater than that of the sleeve 18 to limit movement of the tube portion in one direction within the sleeve.

When the nut N is positioned in the fastener in bolt-receiving position as aforedescribed, the base portion 24 of the nut overhangs the aperture 14 and engages the one side of the body 15 to limit movement of the nut in one direction with respect to the body. Additionally, the separable sleeve 18 has a larger outside diameter than the diameter of the aperture 14 and engages the other side of the body 15 to limit movement of the nut in the opposite direction with respect to the body.

Although the sleeve 18 has been described as extruded from the body 15, it may be formed as a separate part and subsequently secured to the nut tube portion 26 as aforesdescribed.

Before or after the nut N has been inserted into the nut-receiving portion P, the fastening device may be fabricated into final form as shown in Fig. 7, wherein the leg portions 12a and 12b have the outer ends thereof bent diagonally and at an aprroximate right angle (with respect to the central portion of the strip 10), to form the apertured lugs or tabs 36 and 38, with which the fastening device may be mounted on a supporting or connection part R (Fig. 8). Additionally, the nut-receiving portion P may be bent at substantially a right angle in the same direction which the tabs 36 and 38 extend to complete the configuration of the device. The central portion of the strip 10 may have a raised or arched portion 40 to strengthen the fastener in that area. Thus the fastening device shown in Fig. 7 is a substantially U-shaped clip, wherein one arm of the U is the nut-receiving portion P, and the other arm of the U comprises the mounting lugs 36 and 38.

Fig. 8 illustrates an application of the fastener wherein a bolt 42 is threadedly disposed in the nut N. The bolt may have a flange 41 spaced from the bolt head 45 to form the circumferential slot or groove 43, which is adapted to retain an object or part 44 therebetween as shown. A mounting panel R may be provided on which the fastening device may be secured by means of the rivets 49 in the mounting lugs 36 and 38. Additionally, the bolt 42 may be adapted to retain an object or panel 46 or the like between the flange 41 thereon and the nut-retaining portion P of the fastener.

With the above "sleeve-in-sleeve" construction, the nut N is securely held in bolt-receiving position in the fastening device even if the nut becomes brittle and cracks. The construction also allows the nut, with the bolt therein, to "float" in position in the fastening device, thereby affording substantial allowance for misalignment between the parts and device is adapted to connect.

Fig. 9 illustrates a modified fastening device or clip J, which contains the nut-receiving portion P aforedescribed. In this instance, the clip is adapted for insertion onto the edge of an apertured panel or support R (Fig. 10). More specifically, the resilient fingers 50 in their normal, unstressed or unfastened state are spaced from the nut-receiving portion P of the clip a distance slightly less than the thickness of the panel R, to enable the clip to resiliently embrace or grip the panel when it is positioned on the edge thereof as shown in Fig. 10. Also, the clip J is adapted to receive the bolt 42 in the nut-receiving portion P for connecting parts or objects as aforementioned. In Figs. 10 and 11, the panel R contains an aperture 51, which is in axial alignment with the aperture 28 in the nut, thereby allowing the bolt 42 to pass through the apertures for mounting purposes.

Fig. 12 illustrates another modification of a fastening device containing the nut-receiving portion P and, in this instance, takes the form of a clip U, which is adapted also for attachment over the edge of a panel or supporting part R (Fig. 13). The panel R, and the resilient finger 54 contain apertures therein respectively, which are in axial alignment with the aperture in the nut N, thereby enabling the bolt 42 to pass therethrough for mounting purposes as aforedescribed.

Although the invention has been described in connection with U-shaped and J-shaped fastening devices and the like, it will be understood that the invention may be applied to any type of fastening device adapted for receiving or retaining a nut therein.

The nut N may be formed of any suitable metallic or non-metallic material; however, a plastomeric material is preferred since such material is readily molded, has the required strength and elasticity and is elastically thread impressionable.

The supporting part or panel R may be of any suitable material such as sheet metal, wood, fiberboard, or the like; however, inasmuch as the invention is employed mainly in metallic structures, the part R is usually in the form of a metallic panel or plate-like member.

The terms and expressions which have been employed are used as terms of description, and not of limitation, and there is no intention, in the use of such terms and expressions, of excluding any equivalents of the features shown or described or portions thereof, but it is recognized that various modifications are possible within the scope of the invention claimed.

I claim:

1. A method of assembling a plastomeric nut and a metallic fastener comprising extruding a tubular portion from the body of the fastener until it is connected thereto on a weakened line; providing a plastomeric nut having a base, a shank, a shouldered portion on the end of the shank and a shouldered portion adjacent the connection between the base and shank, forcing the shank and the shouldered portion on the end of the shank into the tubular portion of the body by forward motion thereof relative to the body of the fastener until the shouldered portion on the end of the shank projects through said tubular portion of the body, utilizing the shouldered portion adjacent the base on the nut to sever the tubular portion from the body at the weakened line by continued motion of the nut, the shank of the nut having a tight fitting engagement with the tubular portion severed from the body, whereby the severed portion operates to reinforce the shank of the nut.

2. A method of assembling a plastomeric nut and a metallic fastener comprising extruding a tubular portion from the body of the fastener, forming a weakened line between the tubular portion and the fastener body during the extruding of said tubular portion and forcing a plastomeric nut having a base, a shank, a shouldered portion on the end of the shank and a shouldered portion adjacent the connection between the base and shank into the tubular portion until the shouldered portion on the end of the shank projects through the tubular portion of the body in locking relationship therewith, and utilizing the shouldered portion adjacent the base of the plastomeric nut to sever the tubular portion from the body so as to permit limited movement of the nut with respect to the body of the fastener.

3. A method of assembling a plastomeric nut and a metallic fastener comprising extruding a tubular portion from the body of the fastener until it is connected thereto on a weakened line, providing a plastomeric nut having a base, a shank, a shouldered portion on the end of the shank and a shouldered portion adjacent the connection between the base and shank, forcing the shank and the shouldered portion on the end of the shank into the tubular portion of the body by telescoping action until the shouldered portion on the end of the shank projects through said tubular portion of the body, and utilizing the shouldered portion adjacent the base on the nut to sever the tubular portion from the body at the weakened line by continued motion of the nut, whereby the tubular portion surrounds and reinforces the shank of the nut.

References Cited in the file of this patent
UNITED STATES PATENTS

| | | |
|---|---|---|
| 1,226,689 | Nedoma | May 22, 1917 |
| 1,889,778 | Dobrick | Dec. 6, 1932 |
| 2,724,867 | Smith | Nov. 29, 1955 |
| 2,725,621 | Gates | Dec. 6, 1955 |
| 2,822,608 | Watson | Feb. 11, 1958 |